US011622154B2

(12) United States Patent
Ahmad-Taylor et al.

(10) Patent No.: US 11,622,154 B2
(45) Date of Patent: Apr. 4, 2023

(54) METHOD OF RECOMMENDING RELATED PROGRAMS

(75) Inventors: Ty O. Ahmad-Taylor, New York, NY (US); Michael Chen, Wallingford, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 792 days.

(21) Appl. No.: 11/451,769

(22) Filed: Jun. 13, 2006

(65) Prior Publication Data

US 2007/0288963 A1   Dec. 13, 2007

(51) Int. Cl.

| H04N 21/47 | (2011.01) |
|---|---|
| H04H 60/74 | (2008.01) |
| H04N 21/45 | (2011.01) |
| H04N 21/84 | (2011.01) |
| H04N 21/482 | (2011.01) |
| H04N 21/454 | (2011.01) |
| H04N 7/16 | (2011.01) |
| H04N 21/466 | (2011.01) |
| H04H 60/72 | (2008.01) |
| H04N 5/45 | (2011.01) |

(52) U.S. Cl.
CPC .......... *H04N 21/47* (2013.01); *H04H 60/72* (2013.01); *H04H 60/74* (2013.01); *H04N 7/163* (2013.01); *H04N 21/454* (2013.01); *H04N 21/4532* (2013.01); *H04N 21/466* (2013.01); *H04N 21/4668* (2013.01); *H04N 21/482* (2013.01); *H04N 21/4826* (2013.01); *H04N 21/84* (2013.01); *H04N 5/45* (2013.01)

(58) Field of Classification Search
USPC .................................................. 725/46; 5/46
See application file for complete search history.

(56) References Cited

U.S. PATENT DOCUMENTS

| 5,973,683 | A  |    | 10/1999 | Cragun et al. |
|---|---|---|---|---|
| 6,092,049 | A  |    | 7/2000 | Chislenko et al. |
| 6,112,186 | A  |    | 8/2000 | Bergh et al. |
| 6,732,367 | B1 | *  | 5/2004 | Ellis et al. .................. 725/27 |
| 6,732,369 | B1 | *  | 5/2004 | Schein et al. ................ 725/39 |
| 6,973,663 | B1 | *  | 12/2005 | Brown ................ G06F 3/0482 348/E7.06 |
| 2002/0129375 | A1 | * | 9/2002 | Kim et al. .................. 725/100 |
| 2004/0073924 | A1 |   | 4/2004 | Pendakur |
| 2004/0128686 | A1 | * | 7/2004 | Boyer .................... H04N 5/445 725/51 |
| 2004/0216156 | A1 | * | 10/2004 | Wagner ....................... 725/39 |
| 2004/0221310 | A1 | * | 11/2004 | Herrington ........ H04N 5/44543 725/46 |
| 2005/0010951 | A1 | * | 1/2005 | Saito .................... H04N 5/445 725/46 |

(Continued)

OTHER PUBLICATIONS

Canadian Office Action—CA 2,591,385—dated Apr. 22, 2015.

(Continued)

*Primary Examiner* — Nathan J Flynn
*Assistant Examiner* — Christine A Kurien
(74) *Attorney, Agent, or Firm* — Banner & Witcoff, Ltd.

(57) ABSTRACT

Method and system of recommending program without individually compiling subscribe profile information. The method and system being suitable for recommending television programs, movies, and any other media, including but not limited to advertisements and music.

26 Claims, 2 Drawing Sheets

(56) References Cited

U.S. PATENT DOCUMENTS

| | | | |
|---|---|---|---|
| 2005/0076365 A1 | 4/2005 | Popov et al. | |
| 2005/0125828 A1* | 6/2005 | Fujiwara | H04N 5/44543 |
| | | | 725/60 |
| 2005/0138658 A1 | 6/2005 | Bryan | |
| 2005/0171924 A1 | 8/2005 | McGinley et al. | |
| 2005/0251437 A1 | 11/2005 | Meuleman | |
| 2006/0020973 A1* | 1/2006 | Hannum et al. | 725/46 |
| 2006/0277564 A1* | 12/2006 | Jarman | H04N 21/25891 |
| | | | 725/25 |
| 2007/0162937 A1* | 7/2007 | Casement | H04N 5/44543 |
| | | | 725/58 |

OTHER PUBLICATIONS

Response to Canadian Office Action—CA 2,591,385—dated Oct. 20, 2015.
Canadian Office Action—CA 2,591,385—dated Mar. 31, 2016.
Mar. 29, 2017—Canadian Office Action—CA App 2,591,385.
Feb. 28, 2018—Canadian Office Action—CA 2,591,385.
Jan. 24, 2019—Canadian Office Action—CA 2,591,385.
Dec. 17, 2019—Canadian Office Action—CA 2,591,385.
Nov. 4, 2020, Canadian Office Action, CA 2,591,385.
Jan. 24, 2023—CA Office Action—CA App. No. 2,591,385.

* cited by examiner

METHOD OF RECOMMENDING RELATED PROGRAMS

BACKGROUND OF THE INVENTION

1. Field of the Invention

The present invention relates to methods and systems of recommending related programs, such as television shows, movies, music, images, news, articles, and any other type of media or multi-media.

2. Background Art

Media service providers, such as television, audio, print, and the like, distribute content to their subscribes through any number of mediums and provide any number of user interfaces to facilitate the selection and distribution of the same. For example, cable, satellite, and broadcast television service providers may provide their subscribers with an electronic programming guide (EPG) to facilitate searching and selecting content.

The EPGs are typically applications or other programs operable on a television operating system or other feature connected to the television, such as a settop box (STB). In the future, similar capabilities may be provided on computers, PDAs, phones, mobile media devices, and other elements capable of providing television or other media viewing. In general, the EPG includes a number of user navigable menus through which the user may select the programs (movies, television shows, etc.).

As more and more content becomes available through the providers, the providers and subscribers face challenges in locating content of interest. One solution relates to monitoring subscriber habits and recommending content to them as function thereof. This, however, can be problematic as the provider may be required to support and monitor habits for large number of subscribers.

SUMMARY OF THE INVENTION

Accordingly, one non-limiting aspect of the present invention, relates to overcoming the above-identified problems by recommending content likely to be. of interest to subscribers without requiring the content provider to individually track subscriber habits.

One non-limiting aspect of the present invention relates to recommending content to the subscribers as a function of content currently accessed by the subscribers. This allows the content provider to recommend related content without tracking the subscribers habits.

One non-limiting aspect of the present invention relates to recommending program groups to the subscribers as a function of programs highlighted or otherwise selected by the subscribers to be of interest.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
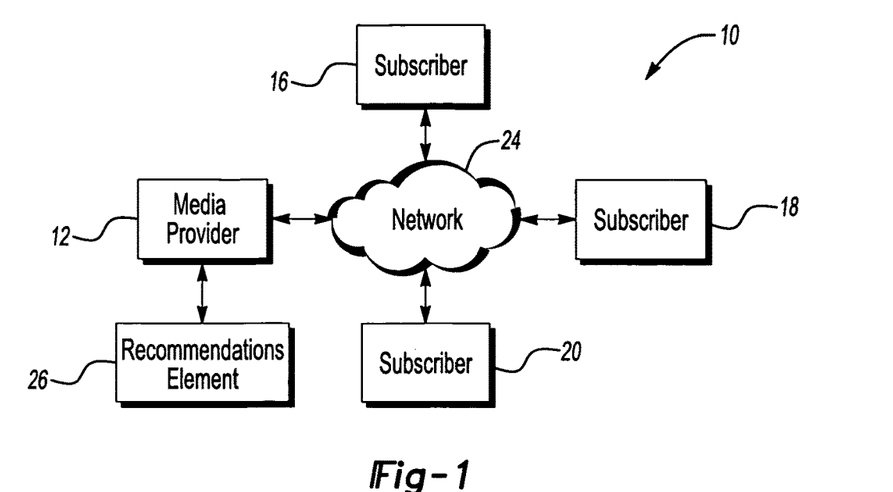
FIG. 1 illustrates a system for providing media content in accordance with one non-limiting aspect of the present invention.

FIG. 1 illustrates a system 10 for providing media content in accordance with one non-limiting aspect of the present invention. The system 10 may include a media provider 12 for providing media services to subscribers 16-20 at one or more subscriber locations and a network 24 for facilitating communications there between.

The media provider 12, for exemplary purpose, is most prominently described with respect to being a cable television service provider having capabilities for providing cable television, telecommunications, and high-speed data services to the subscriber locations, primarily through wireline and/or wireline communications.

The present invention, however, is not so limited and fully contemplates the provider being associated with any type of service provider, including other television providers (IP, broadcast, satellite, etc.) and non-television providers, such as those associated with high-speed data, telecommunications, cellular communications, and the like.

The media provider 12 may be configured to support and/or facilitate the use of any number of television and non-television services and applications, such as, but not limited to, linear and non-linear television programming/signaling (cable, satellite, broadcast, etc.), Video on Demand (VOD), interactive television (iTV), interactive gaming, pay-per-view (PPV), digital video recording (local and remote), and others.

The network 24 may include any number of features and devices to facilitate signal transportation and other operations associated with interfacing the subscriber locations with each other and otherwise supporting communications associated with services of the media provider 12. The network 24 may include terrestrial and extraterrestrial components and infrastructures, including cable lines, telephone lines, and/or satellite or other wireless architectures. The network 24 may be associated with other private and/or public networks, such as the Internet and dedicated or virtual private networks.

The network 24 may include one or more of network support features, such as a headend, router, hub, switch, gateway, conditional access router (CARs), cable modem terminations system (CMTSs), network provisioning unit (NPUs), session boarder controller, media gateway, media gateway controller, signaling gateway, call management server, presence server, SIP routing proxy, SIP proxy/registrar server, PCMM policy server, bandwidth on demand server, streaming server caching proxy, gaming server, CDN, media acquisition server, provider server, a unified messaging server, OSS/BSS, global directory server, digital or personal video recorder (DVRs, PVRs), media terminal adapter (MTA), and/or outlet digital adapter (ODA).

Each subscriber location 16-20 may include one or more media devices (not shown) to facilitate user interaction with the media content/services. The scope of such interaction may be based on subscriptions and other parameters set by the media provider. The subscriptions may specify various classes of services and other parameters associated with usage rights and services available to the corresponding subscriber.

The media devices may relate to any number of devices suitable for interfacing and/or facilitating interfacing the subscribers. For example, the media devices may be a settop box (STB), digital video recorder (DVR), personal computer (PC), television (which may include embedded user interface and processing capabilities), outlet digital adapter (ODA), media terminal adapter (MTA), cable modem (CM), personal digital assistant (PDA), computer, mobile device (phone, computer, etc.), personal media device, and any other item having capabilities to supporting access to any number of the services.

The media devices may be configured to descramble and to support and/or facilitate the use of any number of television and non-television related signals, such as, but not limited to, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

The system 10 may be used to provide media content to one or more of the subscribers 16-20. The media content may relate to live, on-demand, or other viewing, streaming, and/or broadcasting of signals associated with supporting television programming, movies, audio, and other multimedia, as well as, downloading of clips or full-length versions of the same, all of which for exemplary purposes may be generally referred to as programs.

The content sources be the media provider 12 (which in turn may receive the content from other sources) and/or one or more of the subscriber devices or other non-subscriber devices connected the network. For example, if the media provider 12 is a television service provider, a portion of the media content may relate to television programs, movies, and other multimedia packets. This content may be delivered from the media service provider 12 to the subscribers through streaming, downloading, broadcast, peer-to-peer, and any number of other processes.

The media content may be delivered to the subscriber locations directly from the media service provider and/or from one or more of the other devices in communication therewith. In more detail, as is common with larger media content providers, multiple regional enterprises, such as headend units and the like, may be configured to provide regional programming to a number of subscribers associated therewith. Each of the headends may store various types of media content for distribution to the subscribers it services. Optionally, the headends may be configured to support headend to headend communications such that non-direct subscribers, i.e., those supported by other headends, may similarly receive content from other headends.

In addition, some of the media content may be sourced from the subscribers themselves, such as by transporting content stored locally on the home networks of the subscribers to other locations within the same home network and/or to other locations beyond the home network that are in communication therewith by way of the network. The media provider 12 may include features and capabilities to facilitate such inter-subscriber communications.

Furthermore, the media content provider 12 may include software, applications, and other logic to facilitate the distribution and playback of the media content between any of the features, devices, and elements within the system 10. In accordance with one non-limiting aspect of the present invention, the system 10 may include a recommendations element 26 to facilitate recommending media content to the subscribers.

The recommendations element 26 may a server or other element and configured to include any number of features to facilitate recommending related programs to the subscribers 16-20. The recommendations element 26 is shown separately from the media content provider 12, however, it need not be a standalone entity and the operations associated therewith may be similarly performed by the media provider 12 and/or by any number of other devices or combination of devices in the system 10.

Figure 2:
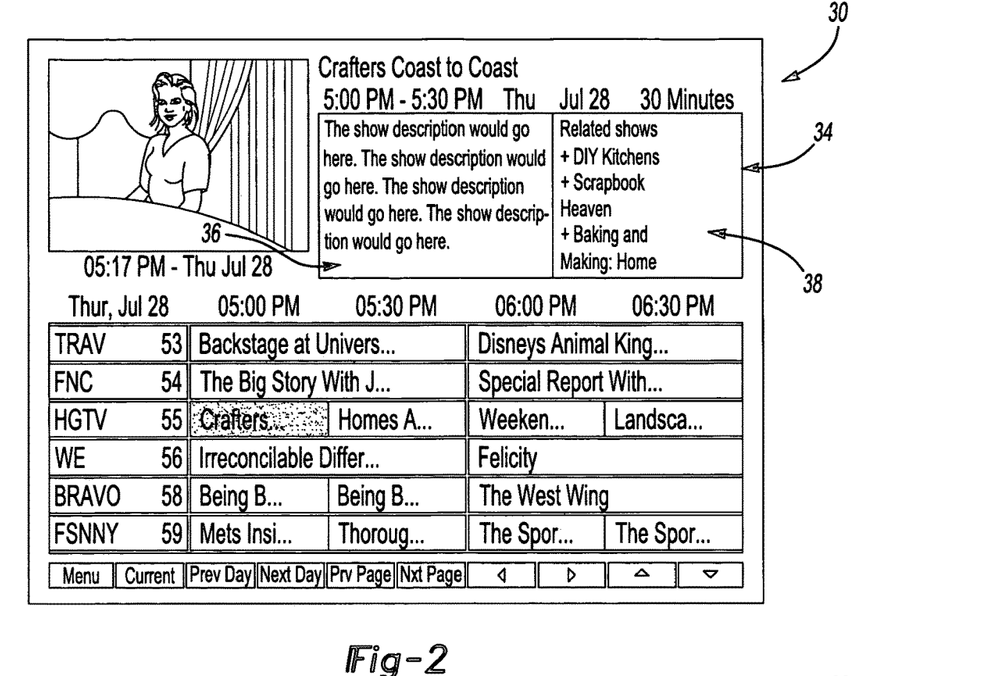
FIG. 2 illustrates an electronic programming guide (EPG) in accordance with one non-limiting aspect of the present invention.

FIG. 2 illustrates an electronic programming guide (EPG) 30 in accordance with one non-limiting aspect of the present invention. The EPG 30, as one having ordinary skill in the art will appreciate, is a navigable user interface through which subscribers may access various services of the media content provider. Commonly, the EPG 30 is supported with a STB or other processing entity at the subscriber location and displayed on a television, or other media access source, such as a computer, mobile phone, PDA, etc. Of course, the EPG 30 is only one exemplary user interface and the present invention fully contemplates the use of any type of user interface.

In operation, the media provider 12 communications EPG program details to the device supporting the EPG 30, which are then used by the EPG application to populate the menus and other interfaces associated therewith. The EPG program details include information and instructions associated with displaying, searching, navigating, and otherwise detailing and accessing the available services/content. The EPG program details are periodically updated with time-spaced downloads of the EPG program details by the application or operating system generating the EPG.

In this manner, once the EPG software/application is loaded on to the STB or other device supporting its operation, the EPG program details are thereafter periodically downloaded to update the information displayed in the EPG 30. The update frequency is variable and may be dependent on the services offered to the subscriber. In this manner, the EPG program details are separate from the application or software used by the subscriber device to display the EPG. Of course, the present invention is not limited to such packet or bundle based, time-spaced downloads and fully contemplates real-time and other services where more interaction occurs between the EPG support device and the media provider.

As shown, the EPG 30 includes a grid based structure having a number of slots for a number of channels and time-periods. The EPG program details may specify a number of program titles to be included within each of the slots in order to indicate a particular program available on the corresponding channel for the corresponding time-slot. This arrangement is commonly used in television environments where a number of channels are available to the subscribers and tuned to by the STB for viewing. The EPG 30, however, may be configured to display the available services through any number of interfaces and guidelines, and is not intended to be limited to the foregoing grid-based structure.

A remote control (not show) or other feature may be included to navigate through the various channels and time-slots shown in the EPG 30, such as to review programs showing on other channels during other time periods. The EPG program details specify how far into the future the programs are shown. Of course, the EPG program details may specify other information included within the EPG, such as programs available on-demand, advertisements, and other types of information.

Moreover, the EPG program details may specify other arrangements and formats for the EPG 30. For example, if other non-channel/time period based services are available, like on-demand programming, DVR applications, audio/data downloads, gaming, and the like, the EPG program details may specify other menus and arrangements of the same through which the user may similarly navigate. These interfaces may include other parameters besides channels and time periods.

In accordance with one non-limiting aspect of the present invention, the EPG 30 may include a recommendations menu 34. The recommendations menu 30 may appear with highlighting of the slots or actuation of a remote control button (not shown), and include a description portion 36 and related programming portion 38. The description portion 36 may be used to provide a show description or other information associated with a highlighted time-slot and the related programming portion 38 may be used to indicated related programs As shown, a Crafters Coast to Coast time-slot is highlighted and a listing of related program titles are shown in the related programming portion 38 and a description (not provided) of Crafters Coast to Coast is shown in the description portion 36. The related programming portion 383 illustrates related programs having characteristics in common or otherwise related to the highlighted program, as described below in more detail.

Advantageously, the related programs included within the related programming group 38 are specified according to a program group associated with the highlighted slot. The related program groups 38 for each slot may be embedded with the EPG program details such that they automatically appear with respect to the highlighted slot and without an upstream communication from the STB or other device supporting the EPG. In this manner, the displayed program group may be considered as a recommended program group. Due to display constraints, the related programming portion 38 of the recommendations menu 34 may be limited in the number of titles it can display, such that scrolling features or other elements may be include to navigate the related programs.

Figure 3:
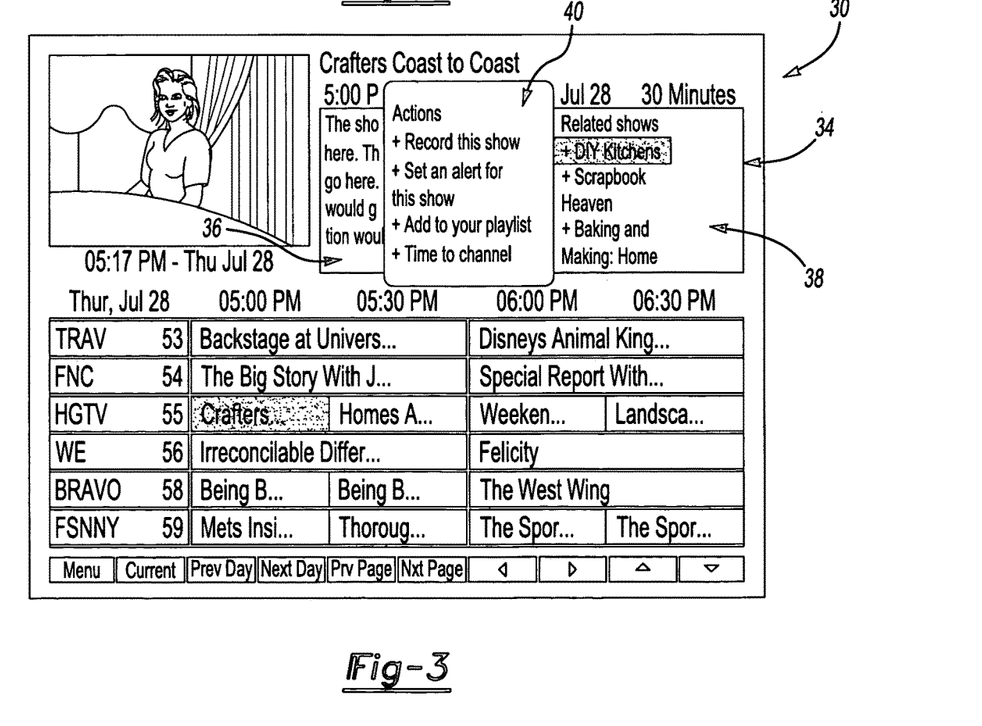
FIG. 3 illustrates the EPG displaying an actions menu in accordance with one non-limiting aspect of the present invention.

FIG. 3 illustrates the EPG 30 displaying an actions menu 40 in accordance with one non-limiting aspect of the present invention. The actions menu 40 appears with selection of one of the programs listed in the related programming portion 38 of the recommendations menu 34 and includes an number of executable programming actions, including setting a recording, setting an alert, adding the selected title to a playlist, or tuning to a channel showing the program associated with the selected title.

Each of the actions is executed with respect to the title selected from the related programming portion 38 of the recommendations menu 34, and not the highlighted slot. In this manner, the user is able to easily access the related programming and to execute actions with respect thereto. Selection of one of the programming actions may transport the user to another interface or other feature associated with executing the operations associated therewith.

Figure 4:
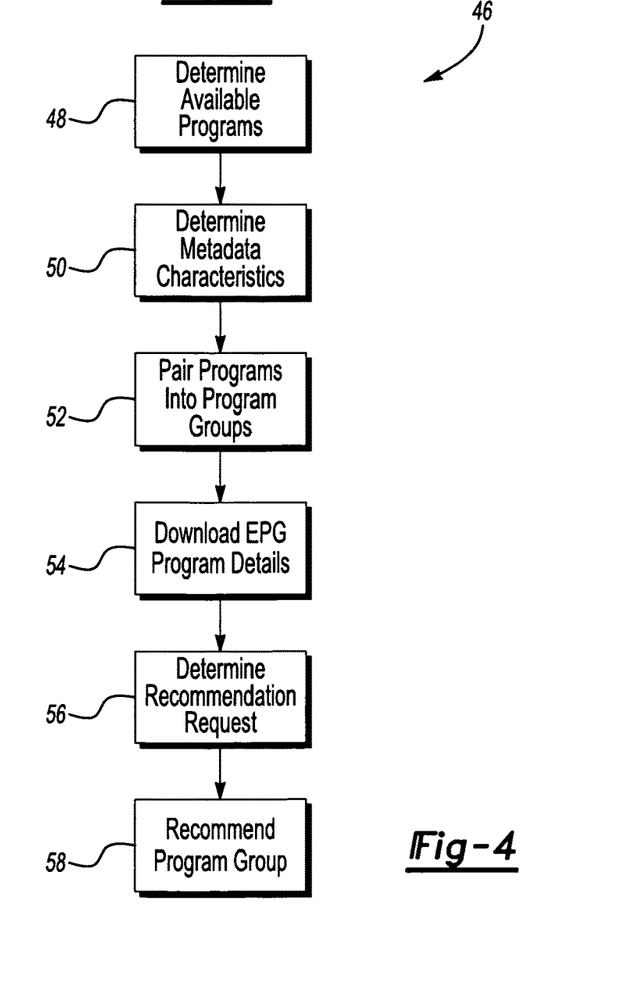
FIG. 4 illustrates a flowchart of a method of recommending related programs in accordance with one non-limiting aspect of the present invention.

FIG. 4 illustrates a flowchart 46 of a method of recommending related programs in accordance with one non-limiting aspect of the present invention. The method may be embodied in a computer-readable medium or other executable file/program. One or more aspects of the method and logic associated with performing the operations associated therewith may be embodied in and executed according to instructions included on the recommendations server 26 and/or other feature or computer readable medium included with the system.

Block 48 relates to determining programs available to the subscribers. The available programs may be determined according to any number of parameters and variables, such as geographical areas or servicing areas. For example, different headends may service different areas and provide different programming in each area such that some programs may be available in one servicing area and not another. In this manner, the available programs are determined for subscriber groups (i.e., servicing areas) and not necessarily individual subscribers so as to limit the amount of information tracked for each subscriber, although tracking individual subscribers is contemplated.

Optionally, each servicing area may include a programming menu or other features associated with coordinating services available to each particular servicing area. This menu may be consulted for upcoming programming and used as the basis for determining the available programs. For example, the programming menu may specify the available program for an upcoming period of time such that the programs associated with that period of time may be determined as the available programs, as opposed to determining all the programs accessible to the media provider 12 as being available.

As described above, the term "program" is not intended to be limited to television programs. The present invention fully contemplates providing any number of services to any number of subscribers and similarly recommending related services. For the purposes of the present invention, the term "program" is intended to reflect any number of services, including television shows, movies, music, images, news, articles, and any other type of media or multi-media available to the subscribers. As such, each step of the method of the present invention may be similarly performed for any other type of media and generally covered with the term "program."

Block 50 relates to determining metadata characteristics for the available programs. The metadata characteristics represent details, information, and other data associated with each of the programs. For example, if the program relates to cooking, one of the metadata characteristics may indicate cooking, cuisine, food, etc., as a characteristic of the program. Preferably, each program is assigned or otherwise associated with one or more metadata characteristics.

Block 52 relates to pairing each program with one or more other programs having common or related metadata characteristics such that the paired programs form program groups having related metadata characteristics. For example, as shown in FIG. 2, the program Crafters Coast to Coast has been paired with a program group comprising DIY Kitchen, Scrapbook Heaven, and Baking and Making: Home.

Different program groups may be determined for each servicing area of the media provider. The program groups may be automatically determined by the media provider at upstream locations and solely form the characteristics of the program, as opposed to the subscribers accessing the programs. In this manner, the present invention is able to determine program groups based on the program characteristics, as opposed to subscriber characteristics, such that same program groups may be assigned to different subscribers, as described below in more detail.

Block 54 relates to downloading the EPG program details to the EPGs of the various subscribers, as described above. The program groups for each paired program may be embedded or otherwise included with the program details, and optionally, downloaded with the same to each EPG support device in the area supported by the particular EPG program details, i.e., subscribers in one area may receive different EPG program details than subscriber in another area.

Block 56 relates to determining a recommendations request for one of the available programs. The recommendation requests may be automatically determined in response to a user highlighting one of the slots shown in FIG. 2 such that the EPG may locate, within the EPG program details, the program group paired with the highlighted program. Of course, any other mechanism or logic may be used in determining the recommendations request, particularly with respect to other interfaces and features used by the subscribers to access other services.

Block 58 relates to recommending the program group associated with the highlighted slot. This may include locating the program group and displaying the program titles listed therein within the recommendations menu shown in FIG. 2. The recommending of the program group in this manner functions to apprise the user of related programs that share a common or related characteristic with the program in the highlighted slot. Of course, the mechanism associated with making the recommendation may vary according to the type of program being recommended and the manner in which it is accessed.

Optionally, the recommended program group may filtered or otherwise partitioned. This may be done at the customer location (i.e., STB) or at a back office or other location associated with providing the recommendations. The filter may be used to limit the recommended programs as a function of availability, entitlements, or other parameters. For example, the availability filter may restrict out programs that are no longer available, such as if the programs have been erased or otherwise unsuitable for retrieval from other subscriber devices or volatile servers, and/or no longer available in a particular servicing area. The entitlement filter may similar restrict out programs that the subscriber is not entitled to view, such as by requiring the STB or other subscriber access point to provide a password or other feature in order to recommend the restricted program.

Another filtering strategy may subsequently partitioning the program groups according to metadata content differences such that one or more of the program groups may include a sub-program group associated with a common content difference, i.e., a group within the group. The sub-groups could then be partitioned along metadata content differences and selectively displayed in the recommendation menu or otherwise. Optionally, the recommendations menu may list the subs-group titles instead of the program titles described above such that the user selects one of the sub-group titles in order to display program titles for the associated sub-group.

Such filtering, particularly at the subscriber level, as opposed to the back-office level, can be beneficial in allowing the back office or other entity generating the program groups to specify the groups independently of individual subscribers, i.e., as a function of the program data and not subscriber data, while still permitting some subscriber specific filtering, such as by allowing the STBs or other subscriber access nodes to filter the program groups. In this manner, one or more programs may be removed, hidden, or otherwise restricted from the program groups with operations at the subscriber level.

A number of subscriber locations may receive the same EPG program details such that each location displays the same related programs (program groups) for the same programs such that the recommended programs are generic to each subscriber within a common servicing area, thereby allowing the media provider to make recommendations without individually tracking subscriber habits and as a function content currently accessed (highlighted) by the subscribers.

Optionally, the program groups may be used for other operations besides displaying recommended content within a programming guide. For example, the program groups may be used to pre-load and prioritize content servers and other elements associated with the subscribers such that the servers may be optimized to quickly deliver content that is believed to be of interested to the subscribers based on its content characteristics. This allows the present invention to optimize VOD, search, and other server response times by optionally pre-loading the servers with the content and/or prioritizing the server such that the content likely to be of interest is prioritized for delivery over content that is less likely to be of interest.

For example, once a subscriber selects content from a programming guide, the program group associated therewith may pre-loaded and/or prioritized in anticipation of the subscriber selecting one of the recommended program titles for further action. Search request may be processed in a similar manner in so far as data, content, and other information recommended in the search request (program group) may be pre-loaded or prioritized for delivery to a server in anticipation of the subscriber selecting one of the search result titles for further action.

The present invention is predominately described with respect to recommending programs within an EPG and the mechanisms and logic associated therewith. The present invention, however, is not intended to be limited to programs and EPG interfaces. Rather, the present invention fully contemplates recommending any type of information, and not just television programs or movies, and doing so through any interface, and not just EPGs, including but not limited to web pages, VOD menus, personal media menus (PDAs, mobile phones, etc.), and the like.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
receiving, by a computing device, at least one indication of an association between a first content asset, of a first plurality of content assets, and a second plurality of content assets, wherein the association is based on a topic that is associated with the first content asset and the second plurality of content assets;
causing output of identifiers of the first plurality of content assets;
based on an input received from a user, causing simultaneous:
highlighting of an un-highlighted identifier of the first content asset
output of a description of the first content asset,
output of an identifier of at least a second content asset of the second plurality of content assets, and
output of a menu comprising a plurality of actions that are executable with respect to the at least the second content asset;
partitioning, into subgroups and based on content differences, the second plurality of content assets; and
simultaneously, with the highlighting and with the output of the description of the first content asset, of the at least the second content asset, and of the menu, causing output of subgroup titles corresponding to the subgroups.

2. A method comprising:
receiving, by a computing device, at least one indication of an association between:
a first content asset of a first plurality of content assets, and
a second plurality of content assets;
causing output of identifiers of the first plurality of content assets;
highlighting, based on input received from a user associated with the computing device, the first content asset of the first plurality of content assets;
filtering, by the computing device and based on an entitlement of the user associated with the computing device, one or more content assets from the second plurality of content assets;
partitioning, into subgroups and based on content differences, the filtered one or more content assets; and
causing output, based on the highlighting, of a menu, wherein the menu comprises:
information associated with the first content asset,
subgroup titles corresponding to the subgroups, and
one or more identifiers of the filtered one or more content assets,
wherein the information associated with the first content asset and the one or more identifiers of the filtered one or more content assets are caused to be output simultaneously in the menu, and
wherein the filtering comprises omitting, by the computing device and from the second plurality of content assets, at least one content asset that the user is not entitled to view.

3. The method of claim 2, further comprising: downloading, by the computing device, content asset details.

4. The method of claim 2, wherein the input is based on a communication received from a remote control device.

5. The method of claim 2, further comprising:
determining that an identifier of a second content asset of the first plurality of content assets is indicated; and
causing output, while the identifier of the second content asset of the first plurality of content assets is indicated, of an identifier of at least a third content asset of a third plurality of content assets related to the second content asset.

6. The method of claim 2, wherein the causing output of the menu comprises:
causing output of the menu adjacent to a grid comprising the identifiers of the first plurality of content assets.

7. The method of claim 2, further comprising:
causing, after receiving a selection of a content asset from the filtered one or more content assets in the menu, output of an interactive menu associated with the selected content asset.

8. The method of claim 2, wherein the first content asset and the second plurality of content assets are associated irrespective of user habits.

9. A method comprising:
receiving, by a computing device, at least one indication of an association between a first content asset, of a first plurality of content assets, and a second plurality of content assets, wherein the association is based on a topic that is associated with the first content asset and the second plurality of content assets;
causing output of identifiers of the first plurality of content assets; and
based on an input received from a user, causing simultaneous:
highlighting of an un-highlighted identifier of the first content asset;
output of a description of the first content asset,
output of an identifier of at least a second content asset of the second plurality of content assets, and
output of a menu comprising a plurality of actions that are executable with respect to the at least the second content asset,
wherein the user is associated with the computing device and belongs to a first user group that is determined based on a geographical location of the user, and
wherein the association is determined based on the first user group.

10. The method of claim 9, wherein the first content asset is associated with different sets of content assets for different user groups.

11. A method comprising:
causing, by a user device, display of a program listing that comprises:
identifications of a plurality of scheduled programs;
an indicator selecting one of the plurality of scheduled programs;
a program description area comprising a description, based on the indicator, of a currently-highlighted program; and
a related program area comprising a list of secondary programs that are related by topic to the currently-highlighted program;
moving, based on user navigation commands, the indicator to different scheduled programs in the program listing; and
updating the program description area and the related program area to provide descriptions and secondary program lists corresponding to the different scheduled programs as the indicator moves to the different scheduled programs in the program listing.

12. The method of claim 11, further comprising:
receiving, by the user device and from a server, an initial program listing, wherein the initial program listing comprises:

the identifications of the plurality of scheduled programs; and
an association between the list of secondary programs and at least one of the plurality of scheduled programs; and
applying, by the user device, filtering to the initial program listing to determine the plurality of scheduled programs identified in the displayed program listing.

13. The method of claim 11, further comprising:
receiving, by the user device and from a server, an update regarding at least one of the identifications or the list of secondary programs,
wherein a frequency of the update is dependent on a service offered to a user associated with the user device.

14. The method of claim 11, wherein the program listing further comprises a description of a first topic, and wherein the updating the program description area and the related program area comprises replacing the description of the first topic with a description of a second topic.

15. The method of claim 12, further comprising:
after the indicator selects the one of the plurality of scheduled programs, loading, by the server and based on the association, programs of the list of secondary programs for transmission to the user device.

16. An apparatus comprising:
one or more processors; and
memory storing instructions that, when executed by the one or more processors, cause the apparatus to:
receive at least one indication of an association between:
a first content asset of a first plurality of content assets, and a second plurality of content assets;
cause output of identifiers of the first plurality of content assets;
highlight, based on input received from a user associated with the apparatus, the first content asset of the first plurality of content assets;
filter, based on an entitlement of the user associated with the apparatus, one or more content assets from the second plurality of content assets;
partition, into subgroups and based on content differences, the filtered one or more content assets; and
cause output, based on the highlighting, of a menu, wherein the menu comprises:
information associated with the first content asset, subgroup titles corresponding to the subgroups, and one or more identifiers of the filtered one or more content assets,
wherein the information associated with the first content asset and the one or more identifiers of the filtered one or more content assets are caused to be output simultaneously in the menu, and
wherein the filtering comprises omitting, by the apparatus and from the second plurality of content assets, at least one content asset that the user is not entitled to view.

17. The apparatus of claim 16, wherein the instructions, when executed by the one or more processors, further cause the apparatus to:
download content asset details.

18. The apparatus of claim 16, wherein the input is based on a communication received from a remote control device.

19. The apparatus of claim 16, wherein the instructions, when executed by the one or more processors, further cause the apparatus to:
determine that an identifier of a second content asset of the first plurality of content assets is indicated; and
cause output, while the identifier of the second content asset of the first plurality of content assets is indicated, of an identifier of at least a third content asset of a third plurality of content assets related to the second content asset.

20. The apparatus of claim 16, wherein the instructions, when executed by the one or more processors, cause the apparatus to:
cause output of the menu by causing output of the menu adjacent to a grid comprising the identifiers of the first plurality of content assets.

21. The apparatus of claim 16, wherein the instructions, when executed by the one or more processors, further cause the apparatus to:
cause, after receiving a selection of a content asset from the filtered one or more content assets in the menu, output of an interactive menu associated with the selected content asset.

22. The apparatus of claim 16, wherein the first content asset and the second plurality of content assets are associated irrespective of user habits.

23. An apparatus comprising:
one or more processors; and
memory storing instructions that, when executed by the one or more processors, cause the apparatus to:
cause display of a program listing that comprises:
identifications of a plurality of scheduled programs;
an indicator selecting one of the plurality of scheduled programs;
a program description area comprising a description, based on the indicator, of a currently-highlighted program; and
a related program area comprising a list of secondary programs that are related by topic to the currently-highlighted program;
move, based on user navigation commands, the indicator to different scheduled programs in the program listing; and
update the program description area and the related program area to provide descriptions and secondary program lists corresponding to the different scheduled programs as the indicator moves to the different scheduled programs in the program listing.

24. The apparatus of claim 23, wherein the instructions, when executed by the one or more processors, further cause the apparatus to:
receive, from a server, an initial program listing, wherein the initial program listing comprises:
the identifications of the plurality of scheduled programs; and
an association between the list of secondary programs and at least one of the plurality of scheduled programs; and
apply filtering to the initial program listing to determine the plurality of scheduled programs identified in the displayed program listing.

25. The apparatus of claim 23, wherein the instructions, when executed by the one or more processors, further cause the apparatus to:
receive, from a server, an update regarding at least one of the identifications or the list of secondary programs,
wherein a frequency of the update is dependent on a service offered to a user associated with the apparatus.

26. The apparatus of claim 23, wherein the program listing further comprises a description of a first topic, and wherein the instructions, when executed by the one or more processors, cause the apparatus to update the program description area and the related program area by replacing the description of the first topic with a description of a second topic.

* * * * *

UNITED STATES PATENT AND TRADEMARK OFFICE
CERTIFICATE OF CORRECTION

| | | |
|---|---|---|
| PATENT NO. | : 11,622,154 B2 | Page 1 of 1 |
| APPLICATION NO. | : 11/451769 | |
| DATED | : April 4, 2023 | |
| INVENTOR(S) | : Ahmad-Taylor et al. | |

It is certified that error appears in the above-identified patent and that said Letters Patent is hereby corrected as shown below:

In the Specification

Column 1, Summary of the Invention, Line 42:
Delete "be." and insert --be-- therefor Column 5, Detailed Description of the Preferred Embodiment(s), Line 21:
Delete "30" and insert --34-- therefor Column 5, Detailed Description of the Preferred Embodiment(s), Line 28:
After "programs", insert --.-- therefor Column 5, Detailed Description of the Preferred Embodiment(s), Line 33:
Delete "383" and insert --38-- therefor In the Claims Column 9, Line 14:
In Claim 1, after "asset", insert --,-- therefor Column 10, Line 29:
In Claim 9, after "asset", delete ";" and insert --,-- therefor Column 11, Line 32:
In Claim 16, after "and", insert --¶-- therefor Signed and Sealed this
Twenty-fifth Day of June, 2024

*Katherine Kelly Vidal*

Katherine Kelly Vidal
*Director of the United States Patent and Trademark Office*